Sept. 13, 1966      P. ZENCZAK      3,272,657
METHOD OF MAKING A BATTERY SEPARATOR
Original Filed Nov. 14, 1960
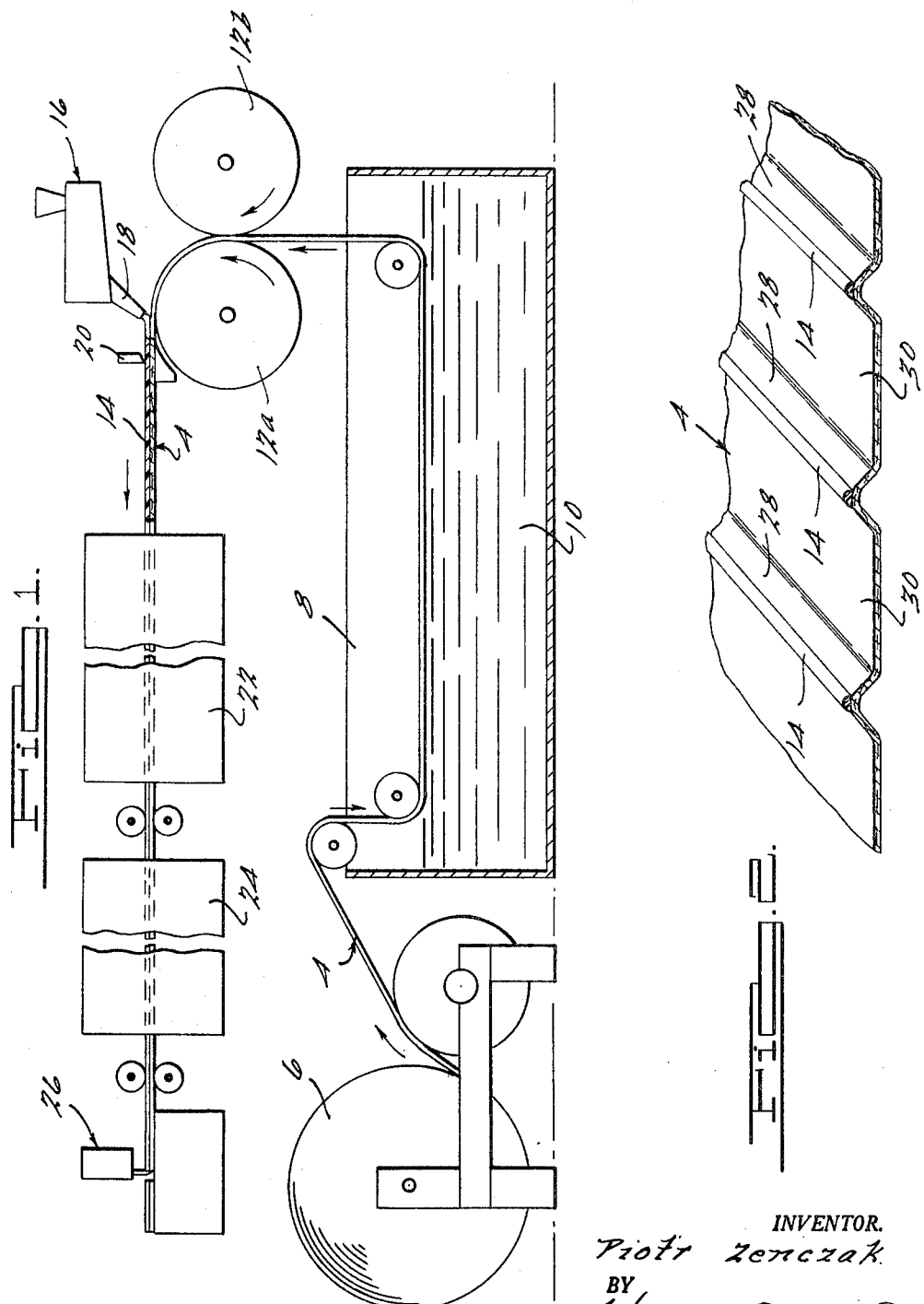
INVENTOR.
Piotr Zenczak
BY
Harness, Dickey & Pierce
ATTORNEYS.

United States Patent Office 3,272,657
Patented Sept. 13, 1966

3,272,657
METHOD OF MAKING A BATTERY SEPARATOR
Piotr Zenczak, Corvallis, Oreg., assignor to Evans Products Company, Plymouth, Mich., a corporation of Delaware
Original application Nov. 14, 1960, Ser. No. 68,878. Divided and this application Jan. 13, 1965, Ser. No. 432,927
1 Claim. (Cl. 136—148)

This application is a division of co-pending application, Serial No. 68,878, filed November 14, 1960, and now abandoned, by Piotr Zenczak for Battery Separator.

The present invention broadly relates to a resin impregnated porous wood fiber base sheet having a plastic material applied to a portion of one surface thereof and tenaciously adhered thereto and more particularly, to a battery separator having a composite rib construction and to a novel method for making the same.

A variety of different configurations have heretofore been proposed or used for separators between the plates of storage batteries of the general type used in automobile electrical systems and the like. Past experience has indicated that battery separators comprising a porous sheet having a ribbed profile are particularly satisfactory for battery designs adapted to supply high amperage cranking currents such as required in automobile starter systems. By virtue of the ribbed configuration of the separator which is disposed with the ribs adjacent to the positive plate, the contact surface between the separator and plate is minimized reducing the oxidation and chemical attack of the separator and additionally provides for a greater volume of electrolyte adjacent the positive plate for use thereby during discharge.

Battery separators presently in use having a ribbed configuration are produced alternatively by forming separators having a series of integral ribs comprising thicker sections of the same material constituting the principal sheet or by embossing a series of longitudinal ribs in a flat sheet, or by adhering a series of longitudinal rib elements to one face surface of a substantially flat sheet. Of the foregoing types, the so-called embossed-rib type to which the present invention pertains is the most prevalent and constitutes the preferred form.

The integral-rib type battery separator is satisfactory for most uses but is relatively expensive to manufatcure and the relatively thick rib sections retard the migration of electrolyte therethrough. The superposed rib-type battery separators comprising a plurality of rib elements superposed on a flat porous sheet are also relatively expensive to manufacture and require rigid control to achieve good adhesion between the sheet and superposed ribs and avoidance of residuary stresses in the resultant cured battery separator.

While the embossed-rib type battery separators are free of the foregoing disadvantages enumerated in connection with the integral-rib and superposed-rib types, the highly oxidizing nature of the positive plate against which the crests of the embossed ribs are disposed has a tendency to oxidize and chemically attack the ribs during abnormal current densities encountered by overcharging the battery. The present invention retains the advantages inherent in the embossed-rib type battery separators and overcomes the oxidation and adhesion problem associated with the ribs providing therewith a battery separator having advantages heretofore unobtainable in separators of similar type.

Accordingly, it is an object of the present invention to provide an improved battery separator of the embossed-rib type employing an oxidation resistant plastic coating along the contacting edge portions of the embossed ribs which is substantially uniformly applied thereon and tenaciously bonded thereto.

Another object of the present invention is to provide an improved battery separator of the embossed-rib type incorporating a composite rib construction which is highly resistant to physical abrasion and oxidation as encountered in storage battery use, and is highly porous facilitating the migration of the battery electrolyte.

Still another object of the present invention is to provide an improved embossed-rib type battery separator incorporating a composite-rib construction which is of simple design, dimensionally stable, durable operation, and of economical manufacture.

A further object of the present invention is to provide a unique process for applying and tenaciously bonding a plastic mixture to a portion of the surface of a wet porous phenol aldehyde impregnated cellulose base sheet achieving thereby a composite sheet material having the requisite porosity and rigidity and free from residuary stresses tending to deform the sheet.

A still further object of the present invention is to provide an improved process for manufacturing battery separators of the embossed-rib type wherein a plastic material is applied to the crests of the embossed ribs enabling partial diffusion thereof into the underlying fibrous substrate providing a tenacious bond therebetween on subsequent curing.

Yet another object of the present invention is to provide an improved process of making battery separators of the embossed-rib type which is of high production capacity, of simple control and regulation, and of versatile and economical operation.

Other objects and advantages of the present invention will become apparent from the following detailed description taken in conjunction with the accompanying drawing, wherein:

FIGURE 1 is a schematic view of the process comprising the present invention and incorporating therein the preferred steps for making battery separators of the embossed-rib type; and FIG. 2 is a fragmentary perspective view partly in section of the improved battery separator comprising the present invention and illustrating the composite embossed-rib construction.

The novel embossed-rib type battery separator and process comprising the present invention and the objects and advantages achieved thereby are based on a discovery of a plastic formulation which can be applied to a wet phenol aldehyde impregnated embossed porous base sheet in the form of thin longitudinal beads or filaments along the crests of the embossed ribs thereon which on subsequent drying and concurrent curing of the impregnated phenol aldehyde resin and plastic beads results in a battery separator which embodies the advantages of embossed-rib type separators without their attendant disadvantages resulting in a superior battery separator and process therefor than any heretofore known.

The process will first be described broadly followed thereafter by a detailed description of each of the processing steps and the compositions of the materials employed. As may be best seen in FIGURE 1, a suitable porous sheet material 4 is unwound from a jumbo roll 6 and extended therefrom over a series of rolls and fed continuously into an impregnating tank 8 containing an aqueous solution of a phenol aldehyde impregnating resin 10. It will also be understood that the sheet 4 may be derived directly from the sheet fabricating mill in lieu of the jumbo roll 6 providing therewith a continuous integrated manufacturing sequence. The sheet 4 is either dipped or floated across the surface of the impregnating resin solution 10 until the desired degree of impregnation has been achieved and travels therefrom between a pair of complementary contoured male and female embossing rolls 12a, 12b, which concurrently squeeze out the excess impregnating resin and impart the desired embossed pattern in the wet impregnated sheet. Just prior to leaving contact with the embossing roll 12a, a plastic rib or bead 14 is applied to the crests of each of the embossed ribs in the sheet such as by an extruder 16 incorporating a plurality of transversely spaced nozzles 18. The wet resin impregnated sheet 4 with the plastic beads 14 thereon passes beneath a sizing knife 20 such as a doctor blade, for example, which sizes the height of the plastic beads assuring substantially uniform height of the composite ribs. The foregoing operating steps are performed substantially at ambient temperature.

After passing the sizing knife 20 the wet resin impregnated sheet 4 having the plastic beads 14 thereon passes into a drying oven 22 wherein substantially all of the moisture is removed without materially advancing the cure of the resin on the sheet. On leaving the drying oven 22 the dried uncured sheet passes into a curing oven or fuser 24 which is maintained at an elevated temperature and wherein both the impregnating resin and the plastic beads are cured. After substantially complete curing of the impregnating resin and plastic beads along the crests of the ribs, the composite cured sheet leaves the fuser 24 and passes through a combination slitter and cutter 26 wherein the sheet is cut in appropriately sized pieces for use as battery separators and the like.

The resultant rib embossed sheet made in accordance with the foregoing process is shown in FIG. 2 and comprises a series of longitudinal ribs 28 disposed in substantially parallel spaced relationship separated by and integrally connected to a series of plain web portions 30. The cured plastic bead 14 is disposed longitudinally along and tenaciously bonded to the projecting crest portion of each of the longitudinal ribs 28. The base sheet 4 is of substantially uniform thickness along the longitudinal ribs 28 and the web portions 30 and usually ranges in thickness of from about 0.025 to about 0.035 inch, for example. The total thickness of the battery separator along the ribs 28 generally ranges from about 0.050 to about 0.130 inch.

By applying the plastic bead 14 to the crests of the longitudinal ribs 28, the quantity of plastic material required to provide the appropriate rib thickness is materially reduced. Moreover, the relatively thin bead along the crest of each rib does not interfere with the migration of the electrolyte through the porous side portions of the longitudinal ribs. The bottom surface of the embossed battery separator as viewed in FIG. 2 is provided with a series of corresponding depressions or indentations extending along the underside of the longitudinal ribs 28. This latter factor also facilitates the circulation of the electrolyte through the ribs and adjacent to the negative battery plate.

Referring now in greater detail to the process and materials utilized therein to provide the improved battery separator comprising the present invention, the material for the base sheet 4 can comprise any of the cellulose base porous sheets heretofore employed for manufacturing battery separators. Although the conventional bibulous cellulosic fibrous sheets prepared by the chemical pulping procedures employed in the paper making industry are satisfactory, a preferred material comprises a lignocellulose porous fibrous sheet of the type disclosed in United States Patent No. 2,882,331 issued to the present inventor and assigned to the same assignee as the present invention. As disclosed in the aforementioned patent, the bibulous lignocellulose sheet is processed so as to retain substantially all of its original lignin content but being relatively free of such materials as tannins, minerals, oils, resins, and the hemicelluloses which readily hydrolyze in battery acid to simple sugars and acetic acid which are undesirable.

While the bibulous lignocellulosic sheet material constitutes the preferred material for the present invention, it will be understood that the present invention is not limited exclusively thereto. The thickness of the sheet can vary in accordance with the characteristics desired in the resultant battery separator, but usually ranges in thickness from about 0.020 inch to about 0.030 inch. To insure that the sheet is readily impregnable with a suitable phenol aldehyde resin and that the resultant cured sheet is readily permeable to the battery electrolyte, the porosity of the sheet is controlled so as to allow from about 14 to about 16 liters of air per minute to pass through an area of 3.14 square inches of the paper under a pressure of ½ inch of mercury. As taught in the aforementioned reference to which reference is made for a more detailed description of the manufacture of the lignocellulosic paper and the characteristics thereof, a suitable foaming agent can be incorporated in the sheet during its processing whereby the porosity thereof is increased to a greater level if desired, and in addition, wetting agents can be incorporated to facilitate impregnation thereof by the aqueous phenol aldehyde solution.

As hereinbefore mentioned, the sheet material can be fed directly from the sheet making process to the battery separator process or alternatively can be rolled in jumbo rolls such as the roll 6 and subsequently processed as shown in FIGURE 1. The sheet 4 as it is unrolled from the jumbo roll 6 passes into the impregnating tank 8 wherein it is either dipped or floated in the impregnating resin solution 10 whereby from about 20% to about 50% by weight of a suitable thermosetting phenol aldehyde resin is distributed throughout the porous matrix.

The impregnation of the sheet with the thermosetting resin has several useful functions including the protection of the component fibers from attack by the electrolyte and additionally, rigidifies the sheet on subsequent curing for easy assembly in the battery. The resin also imparts the desired wet strength to the sheet when the separator is immersed in the electrolyte preventing compression thereof and maintaining substantially uniform spacing between the battery plates thereby preserving efficient circulation of the electrolyte.

The thermosetting resins suitable for impregnating the sheet broadly encompass the phenol aldehyde resins which include the condensation products of phenol, cresol, xylenol, or a higher phenol, with aldehydes such as formaldehyde, acetaldehyde, furfural or other aldehydes capable of condensing with a phenol. These resins can be employed singly or in combination with each other. In the present invention the conventional condensation of phenol itself with formaldehyde comprises a preferred resinous material of the phenol aldehyde groups.

The impregnation of the sheet with the thermosetting phenol aldehyde resins is achieved by utilizing an aqueous solution thereof containing from about 1% to about 50% by weight resin solids, for example, and preferably from about 20% to about 30% by weight resin solids. The phenol aldehyde resins in the aqueous solution are only partly advanced in their cure corresponding to an A-stage resin which in that form preferably have a high dilutibility in water; that is, a minimum dilutibility of 1:8 and low alkalinity, that is, a pH in the range of 7 to 9. In that form the aqueous resin solution is particularly adapted for impregnating the fibrous base sheet and if desired, a suitable wetting agent may be added to the sheet with the resin or independently thereof to further enhance the wettability characteristics thereof. Suitable wetting agents employed in amounts ranging from trace quantities up to about 1% may comprise any of those which will not poison the battery during use of the separator such as, for example, "Aerosol-OT" (the dioctyl ester of sodium sulfosuccinic acid) and the "Tergitols" which are sulphates of the branched chain C8 and higher aliphatic saturated alcohols.

Impregnation of the sheet can be achieved by any suitable techniques such as dipping or spraying, for example, and in the preferred practice of the present invention, the dry sheet 4 is floated across the surface of the impregnating resin 10 contained in the impregnating tank 8 as shown in FIGURE 1. Floating of the dry sheet in this manner permits the resin solution to be imbibed from its lower surface whereupon it rises by capillary action through the porous fibrous sheet expelling the air before it through the open upper surface thereof. This procedure insures almost instantaneous saturation of the sheet with the aqueous resin solution. The temperature of the aqueous resin solution is maintained at about room temperature or slightly thereabove such as, for example, about 90° F., and is maintained substantially constant by suitable controls.

After impregnation, the wet resin impregnated sheet passes between the male and female embossing rolls 12a, 12b which squeeze out the excess of the impregnating resin and concurrently emboss the sheet with a series of longitudinal ribs such as the ribs 28 in the direction of travel of the sheet. Before the wet embossed sheet leaves the roll 12a, the plastic rib 14 is extruded along the crest portion of each of the longitudinal ribs 28 by a series of nozzles 18 disposed in transverse spaced relationship at intervals corresponding to the distance between the embossed ribs. Immediately thereafter the plastic beads 14 are sized by the sizing knife 20 to secure the proper caliber. The specific configuration of the plastic bead 14 and the relative width and height thereof can be varied in accordance with the specific configuration desired and is controlled by the design of the nozzle orifice and the relationship of the sizing knife 20 during the sizing operation.

The direct superposing of the plastic bead 14 on the crest of the wet embossed rib provides for tenacious bonding of the plastic bead to the fibrous substrate on subsequent curing producing a battery separator substantially devoid of residuary stresses. This technique has been made possible by a novel formulation of the plastic material comprising the plastic bead 14 which provides good initial adhesion to the resin impregnated fibrous sheet. In addition, the plastic formulation employed for extruding the plastic beads 14 on the crests of the ribs also possesses the requisite hardness, flexural strength, oxidation resistance, heat resistance, and high melting point which provides satisfactory operation under the variety of conditions encountered in storage battery use. The heat resistance and high melting point of the plastic bead comprises still a further advantage in that the battery separator can be satisfactorily employed in dry battery charge systems in which the battery components are subjected to temperatures as high as about 350° F. Such high temperature conditions have rendered conventional battery separations having thermoplastic ribs thereon ineffective because of the fusion and melting of the resinous ribs at these high temperatures.

The plastic bead material prior to curing can be broadly described for the purposes of the present invention and the subjoined claims as a modified vinyl resin or an organosol comprising a polyvinyl chloride base plastisol containing a suitable filler, an A-stage phenol aldehyde resin, and a mutual or master solvent in a quantity sufficient to provide a substantially uniform dispersion of the plastisol and phenol aldehyde resin at a consistency suitable for extrusion of the resinous beads. A small amount of a suitable dye or pigment can also be incorporated, if desired, to impart a characteristic color to the plastic beads. The polyvinyl chloride base plastisol can be comprised entirely of a thermoplastic vinyl chloride polymer or can comprise a major proportion of polyvinyl chloride such as, for example, at least about 80% and a minor proportion comprising a copolymerizable monomer such as vinyl acetate, vinylidene chloride, diethyl maleate, etc. Plastisols consisting essentially of polyvinyl chloride, a filler, and a suitable proportion of plasticizer have been found particularly satisfactory for the present invention and constitute the preferred formulation. Polyvinyl chloride resins satisfactory for formulating the plastisols include, for example, Opalon 410 manufactured by Monsanto Chemical Co. and a polyvinyl chloride resin designated as Q.Y.N.V. and produced by Union Carbide Corporation.

The polyvinyl chloride base resin in the plastisol can be plasticized by an appropriate quantity of any one of a number of suitable plasticizers such as the phthalates, phosphates, polybasic and monobasic acid esters, and polymerics which are conventionally employed in vinyl plastisols and which plasticizers are chemically stable and resistant to hydrolysis and oxidation when immersed in the electrolyte and subject to the operating conditions in a storage battery. Of the foregoing, dioctyl phthalate (DOP) has been found particularly satisfactory because of its high chemical resistance to hydrolysis and oxidation and constitutes the preferred plasticizer.

In addition to the polyvinyl chloride resin and the plasticizer, the plastisol can also contain any one of a variety of compatible filler materials such as clays, silica gels, titanium dioxide, calcium sulphate and talc, for example, which primarily act as extenders. Of the foregoing, talc constitutes a preferred filler because of the magnitude of extensibility provided thereby and the favorable properties of the resultant plastic beads achieved thereby.

In addition to the foregoing, the plastic bead 14 also contains a suitable proportion of a phenol aldehyde resin of the same type as employed for impregnating the sheet. As in the case of the impregnating resin, the preferred thermosetting resin in the plastic bead material comprises the condensation product of phenol itself with formaldehyde of the A-stage type. The phenol aldehyde resin can be conveniently introduced as a solution in water containing about 70% to about 80% solids. A satisfactory material is the phenol formaldehyde resin designated AMRES S-660 manufactured by the American Marietta Co. and containing about 73% solids in a water solution. Inasmuch as the phenol aldehyde resin and vinyl plastisol are incompatible, a suitable mutual or master solvent is required to act as a blending agent for dissolving both of the resins forming a substantially uniform dispersion thereof. Any suitable solvent or mixtures thereof can be employed for this purpose such as furfural and furfuryl alcohol, for example. Of the variety of solvents used, furfuryl alcohol represents the preferred material.

The preparation of the plastic bead material is best achieved by first placing the appropriate quantities of a dry powdered polyvinyl resin and talc in a high shear mixer to which approximately half of the designated quantity of plasticizer is added. After the lumps have been reduced in size and a substantially homogeneous mass is obtained the balance of the plasticizer is added followed thereafter by the addition of the phenol aldehyde resin and mutual solvent which is added until the proper viscosity is obtained. Mixing of all the ingredients is continued for about a period of about 30 minutes assuring a substantially homogeneous blend. The resultant resinous mixture having a consistency of a heavy syrup can be conveniently delivered to the extruder by gravity flow from the mixer.

The consistency or viscosity of the plastic material is controlled so as to facilitate application thereof to the crests of the embossed ribs such as by extrusion, for example, and retain its shape during subsequent drying and curing without flowing off the ribs. A viscosity range of the plastic bead material which is particularly satisfactory for extruding the plastic beads in accordance with the preferred practice of the present invention is tabulated below in terms of centipoises as measured by a Brookfield Viscometer of the torsion type and produced by the Brookfield Engineering Laboratories, Inc. of Stoughton, Massachusetts. The viscosity data are tabulated for the preferred range as well as the preferred average value of the viscosity of the plastic bead material at several different rotational flow speeds of a Brookfield No. 5 spindle:

TYPICAL VISCOSITY OF PLASTIC BEAD MATERIAL

| Rotational Flow Speed, r.p.m. | Viscosity, Centipoises×10⁻³ | |
|---|---|---|
| | Preferred Range | Preferred Value [1] |
| 1½ | 55–110 | 80 |
| 2½ | 39–55 | 49 |
| 5 | 25–37 | 31 |
| 10 | 15–26 | 21 |
| 20 | 8–20 | 14 |
| 30 | [2] 7–[2] 18 | [2] 13 |
| 40 | [2] 6–[2] 17 | [2] 13 |

[1] Average.
[2] Extrapolated.

Three typical formulations of the plastic bead material are tabulated below which are provided for the purpose of further illustration and are not intended to be limiting in any way:

FORMULATION A

Material: Parts by weight
- Polyvinyl Chloride (Powdered Opalon 410) __ 100
- Plasticizer (DOP) _____ 50
- Phenolic Resin (AMRES S-660, 73% Solids) __ 60
- Furfuryl Alcohol _____ 75
- Talc _____ 200

FORMULATION B

Material: Parts by weight
- Polyvinyl Chloride (Powdered Opalon 410) __ 100
- Plasticizer (DOP) _____ 50
- Phenolic Resin (AMRES S-660, 73% Solids) __ 50
- Furfuryl Alcohol _____ 60
- Talc _____ 150

FORMULATION C

Material: Parts by weight
- Polyvinyl Chloride (Powdered Opalon 410) __ 100
- Plasticizer (DOP) _____ 50
- Phenolic Resin (AMRES S-660, 73% Solids) __ 35
- Furfuryl Alcohol _____ 24
- Talc _____ 75
- Yellow Pigment _____ 1

It has been found that in order to achieve appropriate adhesion of the plastic bead mixture to the wet impregnated sheet at least about 20 parts by weight of a phenol aldehyde resin should be used (on a solids or nonvolatile basis) for every 100 parts of the polyvinyl chloride resin. In addition to providing for adhesion to the wet sheet, the phenol aldehyde resin constituent also increases the hardness and melting point of the plastic bead and accordingly, the proportion of the phenol aldehyde resin constituent is increased whenever the battery separator is to be subjected to high temperature conditions. Since an increase in the proportion of phenol aldehyde resin in the formulation is also accompanied by a decrease in the flexibility of the plastic bead, the amount of phenol aldehyde resin is preferably limited to a maximum of about 50 parts by weight (solids basis) per 100 parts of polyvinyl chloride resin to retain the desired degree of flexibility.

As heretofore mentioned, the plastic bead material is applied preferably by extrusion in the form of continuous filaments to each of the crests of the wet embossed ribs in the sheet just prior to leaving the embossing roll 12a. After passing under the sizing knife, the composite wet sheet having the plastic bead 14 thereon enters a tunnel-type drying oven 22 wherein the sheet is subjected to high velocity air at an elevated temperature preferably ranging from about 200° F. to about 300° F. The temperature in the drying oven 22 is preferably controlled so as to progressively increase from the inlet end toward the outlet end. For example, a temperature of about 200° F. at the inlet increasing gradually to a temperature of about 300° F. at the outlet of the drying oven is preferred. The drying oven is heated to a controlled temperature by any one of a variety of means well known in the art such as by steam coils and the length thereof is determined by such factors as the speed or rate of feed of the sheet, the temperature in the oven, and the water content of the sheet. The drying conditions in the oven and the linear speed of the sheet when passing continuously therethrough are controlled so as to remove the moisture therefrom without materially advancing the cure of the resins therein and thereon.

On leaving the drying oven 22 the substantially dry but uncured sheet enters the curing oven or fuser 24 which is electrically controlled at a temperature ranging from about 450° F. up to about 650° F. While in the fuser 24 the phenol aldehyde impregnating resin and the plastic bead material are concurrently cured to a substantially completely cured state. A correlation of such factors as the temperature in the fuser, the linear speed of the sheet therethrough and the specific composition of the resins employed establish the length or total dwell time of the sheet in the fuser 24 to achieve substantially complete curing of the resins. Inasmuch as higher temperatures enhance the rate of cure of the resins facilitating higher production capacity, a temperature of about 600° F. is usually employed in the fuser 24.

A typically illustration of a drying and curing cycle of a lignocellulose sheet having a density ranging from about 14 to about 16 grams per square foot and having a phenol formaldehyde impregnating resin retention of about 35% by weight on a dry sheet basis and having plastic beads thereon of a composition corresponding to Formulation A in the preceding table requires about 2 minutes drying time in the drying oven maintained at a temperature of about 290° F. and a curing dwell time period of about 15 seconds in the fuser 24 maintained at a temperature of about 600° F.

The resultant rigidified composite sheet material passes from the fuser 24 and is concurrently slit and cut into the appropriate sizes suitable for battery separators and the like.

While it will be apparent that the preferred embodiments herein illustrated are well calculated to fulfil the objects above stated, it will be appreciated that the invention is susceptible to modification, variation and change without departing from the proper scope of fair meaning of the subjoined claims.

What is claimed is:

The method of making a battery separator comprising the steps of providing a porous sheet of bibulous lignocellulosic paper, impregnating said sheet with an aqueous solution containing from about 1% to about 50% of an A-stage phenol aldehyde resin until said sheet contains from about 20% to about 50% by weight resin solids on a dry sheet basis, passing the wet impregnated said sheet between a pair of embossing rolls formed with mating circumferential rib and grooves disposed at longitudinally spaced intervals therealong and imparting a pattern to said sheet comprising a plurality of ribs and webs extending longitudinally of said sheet, immediately thereafter and without any appreciable reduction in the water content of the wet embossed said sheet applying a plastic bead on the crests of each of said ribs of the wet impregnated said sheet, said plastic bead comprising a substantially homogeneous blend of a polyvinyl chloride base plastisol including a filler, and a thermosetting A-stage phenol aldehyde resin in a solvent and present in the proportions by weight of about 150 parts plastisol, from about 20 to about 50 parts phenol aldehyde resin on a solids basis, from about 75 to about 200 parts filler, and a quantity of solvent sufficient to form a substantially homogeneous blend; drying said sheet to remove the moisture therefrom without appreciably advancing the cure of the phenol aldehyde resins, and thereafter curing said resin and said plastic bead at a temperature ranging from about 450° F. to about 650° F.

References Cited by the Examiner

UNITED STATES PATENTS

| | | | |
|---|---|---|---|
| 2,591,755 | 3/1952 | Wilson et al. | 136—146 |
| 2,862,988 | 12/1958 | Dillehay et al. | 136—146 |
| 2,936,328 | 2/1960 | Sillcox et al. | 136—145 |

FOREIGN PATENTS 1,147,735  6/1957  France.

WINSTON A. DOUGLAS, *Primary Examiner.*

D. L. WALTON, *Assistant Examiner.*